US010062461B2

(12) United States Patent
Ko et al.

(10) Patent No.: US 10,062,461 B2
(45) Date of Patent: Aug. 28, 2018

(54) SPENT FUEL TRANSFER DEVICE FOR TRANSFERRING SPENT FUEL BETWEEN STORAGE POOLS

(71) Applicant: KEPCO ENGINEERING & CONSTRUCTION COMPANY, INC., Gyeonggi-do (KR)

(72) Inventors: Kwang Jeok Ko, Daejeon (KR); Ho Jung Lee, Daejeon (KR); Il Seon Hwang, Daejeon (KR); Min Gyu Kim, Daejeon (KR); Sang Gyoon Chang, Sejong-si (KR)

(73) Assignee: KEPCO ENGINEERING & CONSTRUCTION COMPANY, INC., Gyeonggi-Do (KR)

( * ) Notice: Subject to any disclaimer, the term of this patent is extended or adjusted under 35 U.S.C. 154(b) by 237 days.

(21) Appl. No.: 14/983,114

(22) Filed: Dec. 29, 2015

(65) Prior Publication Data
US 2017/0110208 A1    Apr. 20, 2017

(30) Foreign Application Priority Data

Oct. 20, 2015  (KR) .......................... 10-2015-0146098

(51) Int. Cl.
*G21C 19/32*    (2006.01)
*G21C 19/10*    (2006.01)

(52) U.S. Cl.
CPC ............. *G21C 19/32* (2013.01); *G21C 19/10* (2013.01); *G21Y 2002/40* (2013.01)

(58) Field of Classification Search
CPC ............ G21C 19/32; G21C 17/00; G21F 5/14
See application file for complete search history.

(56) References Cited

U.S. PATENT DOCUMENTS

| 3,835,617 A * | 9/1974 | Stock ........................ B65B 3/04 |
| | | 414/146 |
| 5,325,408 A * | 6/1994 | Hornak .................. G21C 19/10 |
| | | 376/260 |
| 6,404,836 B1 * | 6/2002 | Matteson ............... G21C 19/18 |
| | | 376/268 |

(Continued)

FOREIGN PATENT DOCUMENTS

| CN | 1261715 A | 8/2000 |
| CN | 201408555 Y | 2/2010 |

(Continued)

OTHER PUBLICATIONS

Office Action, dated Jun. 23, 2016, issued in Korean Patent Application No. 10-2015-0146098, 18 pages.

(Continued)

*Primary Examiner* — Jack W Keith
*Assistant Examiner* — Lily C Garner
(74) *Attorney, Agent, or Firm* — Nixon Peabody LLP; Jeffrey L. Costellia

(57) ABSTRACT

Provided is a device for transferring spent fuel between spent fuel storage pools. The device includes a transfer container extending in a direction, disposed in a vertical direction, and containing spent fuel therein; a guide frame configured to guide the transfer container while maintaining a vertical orientation of the transfer container; and a transfer unit configured to transfer the transfer container along the guide frame.

6 Claims, 9 Drawing Sheets

(56) References Cited

U.S. PATENT DOCUMENTS

| | | |
|---|---|---|
| 6,580,085 B1 | 6/2003 | Gaucherand |
| 6,587,536 B1 * | 7/2003 | Singh .................... G21C 19/00 |
| | | 376/260 |
| 2013/0044850 A1 | 2/2013 | Walton et al. |
| 2013/0170598 A1 * | 7/2013 | Komuro ................ G21C 9/016 |
| | | 376/280 |

FOREIGN PATENT DOCUMENTS

| | | | |
|---|---|---|---|
| CN | 103000237 A | | 3/2013 |
| JP | 07218685 A | | 8/1995 |
| JP | 2002503821 A | | 2/2002 |
| KR | 100680483 B1 | * | 2/2007 |
| KR | 100680483 B1 | | 2/2007 |
| KR | 20090123073 A | * | 12/2009 |
| KR | 2015-0084410 A | | 7/2015 |
| KR | 20150084410 A | * | 7/2015 |

OTHER PUBLICATIONS

Notice of Allowance dated Dec. 6, 2016 of the Korean Patent Application No. 10-2015-0146098.
Chinese Office Action, dated Aug. 1, 2017, issued in Chinese Patent Application No. 201511001531.3, 6 pages.

* cited by examiner

SPENT FUEL TRANSFER DEVICE FOR TRANSFERRING SPENT FUEL BETWEEN STORAGE POOLS

CROSS-REFERENCE TO RELATED APPLICATION

This application claims the benefit of Korean Patent Application No. 10-2015-0146098, filed on Oct. 20, 2015, in the Korean Intellectual Property Office, the disclosure of which is incorporated herein in its entirety by reference.

BACKGROUND

Field

One or more exemplary embodiments relate to a device for transferring spent fuel between storage pools, and more particularly, to a device for transferring spent fuel to a designated location while maintaining a vertical orientation of the spent fuel within a refueling cavity.

Description of the Related Art

A general nuclear power plant has one spent fuel storage pool, taking into account a nuclear fuel storage capacity corresponding to twenty-years amount for each nuclear plant unit. In addition, during a planned maintenance period of a power plant, fuel is withdrawn from a nuclear reactor for examination and transferred in parallel from a containment building to a fuel handling area by a fuel transfer system provided in a refueling cavity, and then, the fuel is stored in a single storage pool through a gate adjacent to the refueling cavity by using a spent fuel handling machine.

In particular, as shown in FIG. 1, during the planned maintenance period of a power plant, the fuel in a nuclear reactor is transferred from a containment building 1 to a fuel handling area 2 by a fuel transfer system 3. The fuel transfer system 3 is provided in a refueling cavity 4. The fuel transfer system 3 moves along a guide rail 9. The fuel transferred to the nuclear fuel handling area 2 is transferred to and stored in a storage pool 6 via a gate 10 that is adjacent to the refueling cavity 4 by using a spent fuel handling machine 5. The spent fuel handling machine 5 moves along a rail 8.

The fuel transfer system 3 includes a fuel transfer tube 7 between the containment building 1 and the fuel handling area 2. In addition, a penetration sleeve bland flange and a gate valve are provided at opposite ends of the fuel transfer tube 7 for separating the containment building 1 and the fuel handling area 2. Also, complicated supplementary equipment such as an upender for standing or laying the transferred fuel, a hydraulic power units, a connection hose, a cable, and a proximity switch for checking connections states are included in the fuel transfer system 3.

However, there is a need to build a separate storage pool in addition to an existing storage pool corresponding to a twenty-year amount for each nuclear plant unit according to demands for increasing storage capacity when a new nuclear power plant is built. To do this, it is necessary to design a device for transferring fuel between a plurality of storage pools in water.

SUMMARY

One or more exemplary embodiments include a spent fuel transfer device capable of transferring spent fuel to a designated location while maintaining a vertical orientation of the spent fuel within a refueling cavity.

Additional aspects will be set forth in part in the description which follows and, in part, will be apparent from the description, or may be learned by practice of the presented embodiments.

According to one or more exemplary embodiments, a device for transferring spent fuel between spent fuel storage pools, the device includes: a transfer container extending in a direction, disposed in a vertical direction, and containing spent fuel therein; a guide frame configured to guide the transfer container while maintaining a vertical orientation of the transfer container; and a transfer unit configured to transfer the transfer container along the guide frame.

The transfer container may include a plurality of first holes for cooling down the spent fuel.

The transfer container may include a second hole on a lower portion thereof for cooling-down and discharging cooling water.

A bumper may surrounds with an upper end portion of the transfer container in a direction perpendicular to a lengthwise direction of the transfer container so as to maintain a distance between the transfer container and a spent fuel handling machine that transfers the spent fuel to the transfer container.

The guide frame may include support frames disposed on a bottom surface of a refueling cavity in a vertical direction to be spaced apart from each other, and a guide rail disposed in a horizontal direction to be coupled to the support frames.

The device may further include a guide wheel coupled to the transfer container, and the guide wheel may move along the guide rail.

The transfer unit may include: a pulley coupled to the guide frame; a transfer wire wound around the pulley; a winch system configured to wind or unwind the transfer wire; and a controller configured to control the winch system.

The transfer container and the guide frame may be detachably coupled to an inner wall surface of the refueling cavity.

A guide protrusion inserted in a recess of the guide wheel may be provided on an upper surface of the guide rail and a guide recess may be formed in a lower surface of the guide rail, and the device may further include a guide pin having one end portion connected to the transfer container and the other end portion inserted in the guide recess.

Base plates may be disposed on a bottom surface of the refueling cavity for coupling to the support frames, lower end portions of the support frames are coupled to the base plates, and a positioning protrusion may be formed on each of the base plates and an insertion recess into which the positioning protrusion is inserted is formed in a lower surface of each of the support frames.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
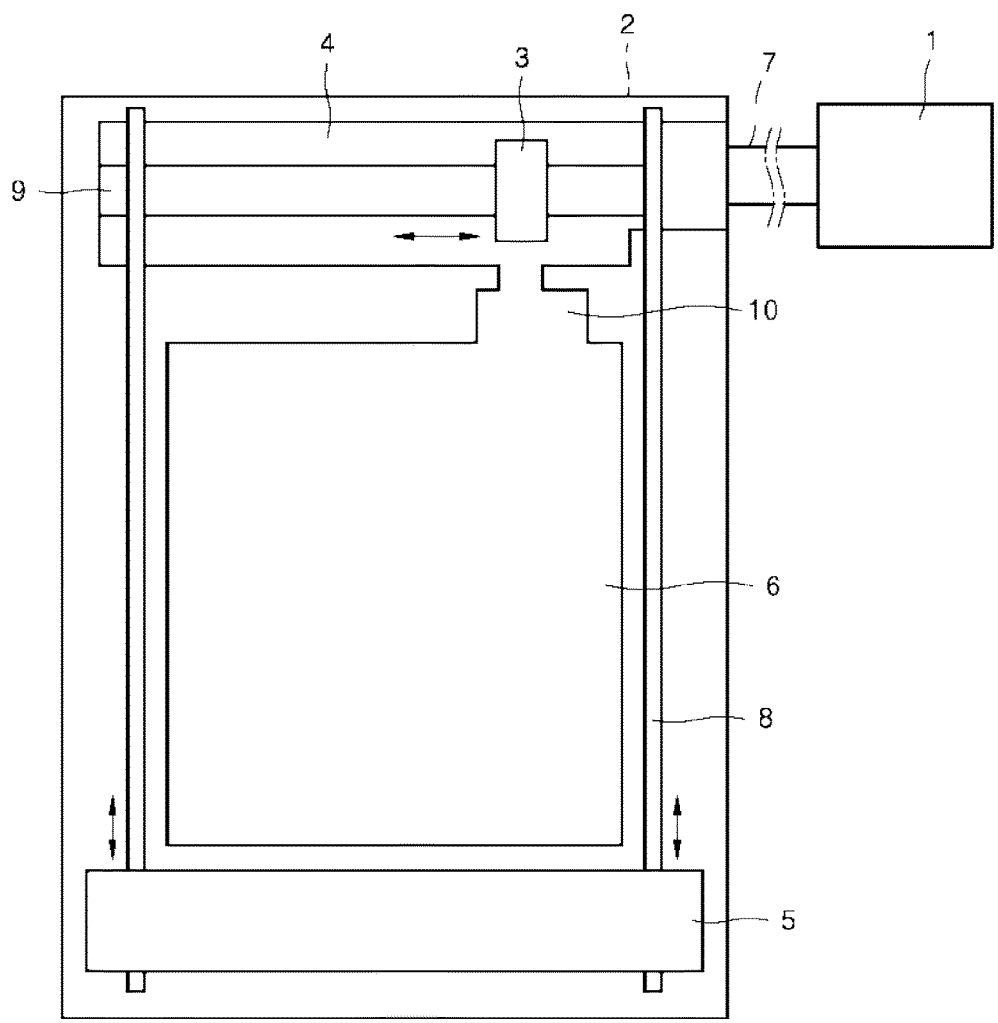
FIG. 1 is a plan view of a refueling cavity and a spent fuel handling machine according to the prior art.

Reference will now be made in detail to embodiments, examples of which are illustrated in the accompanying drawings, wherein like reference numerals refer to like elements throughout. As used herein, the term "and/or" includes any and all combinations of one or more of the associated listed items. Expressions such as "at least one of," when preceding a list of elements, modify the entire list of elements and do not modify the individual elements of the list.

Figure 2:
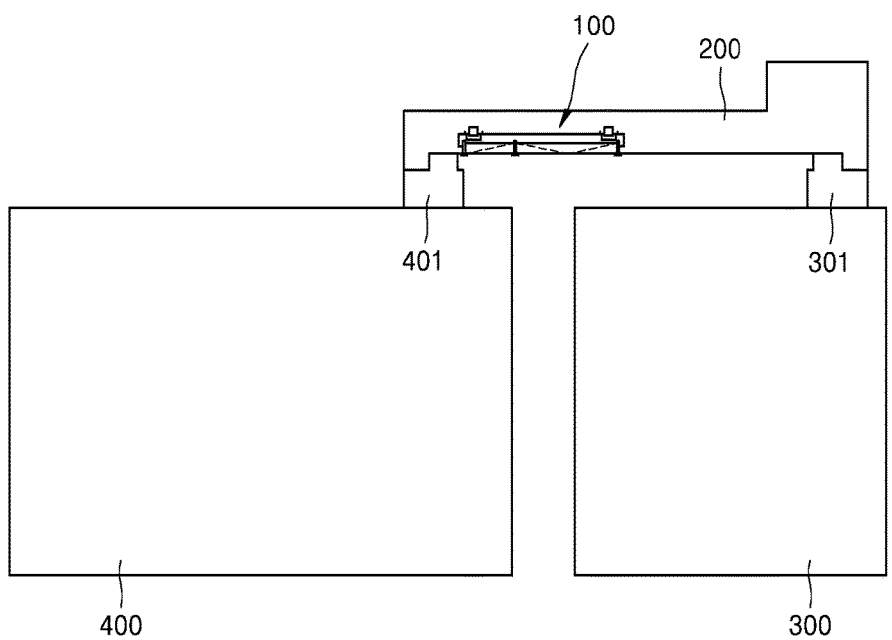
FIG. 2 is a conceptual view showing an arrangement of a spent fuel transfer device according to an exemplary embodiment.
Figure 3:
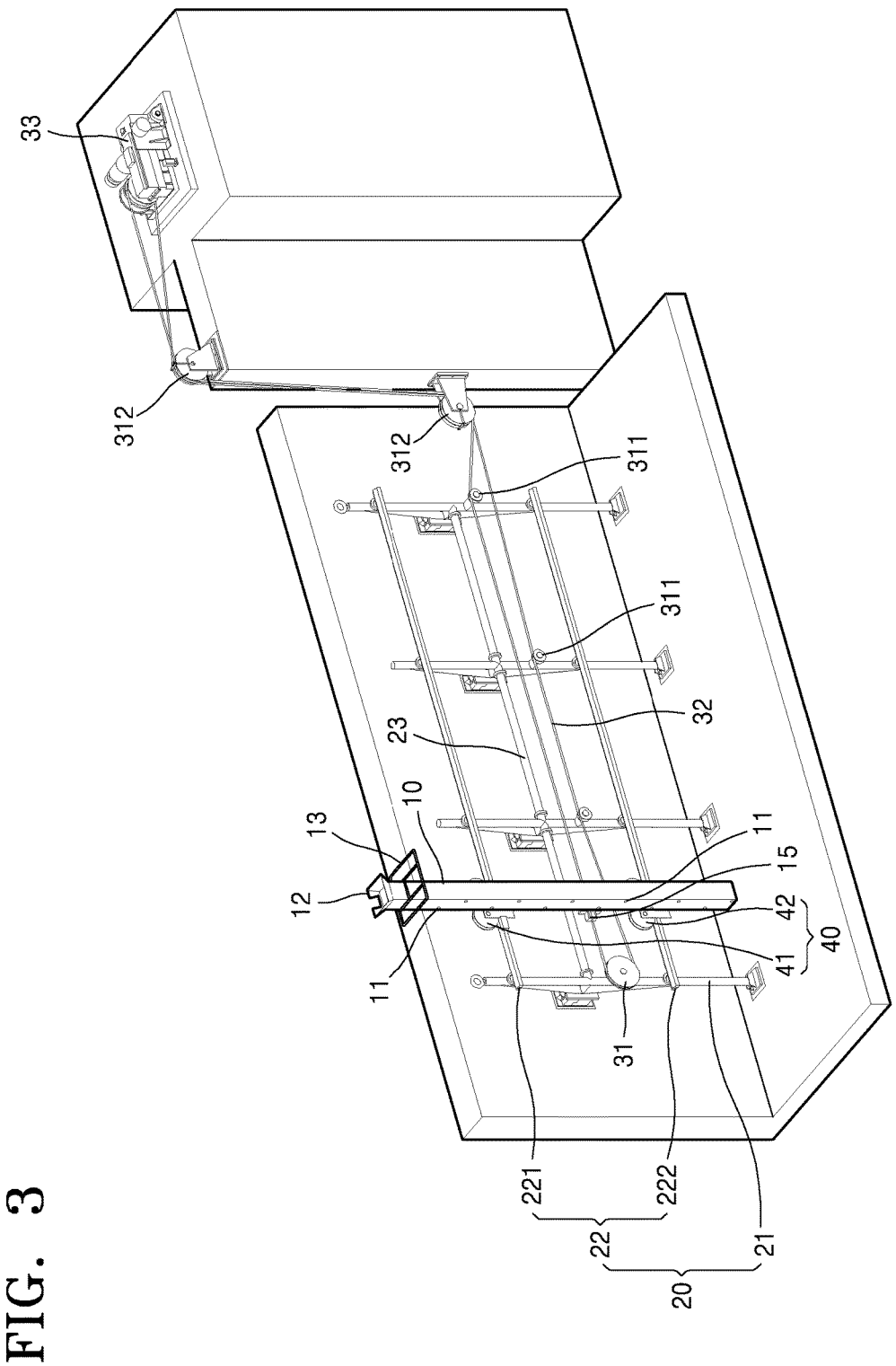
FIG. 3 is a perspective view of a spent fuel transfer device according to an exemplary embodiment.
Figure 4:
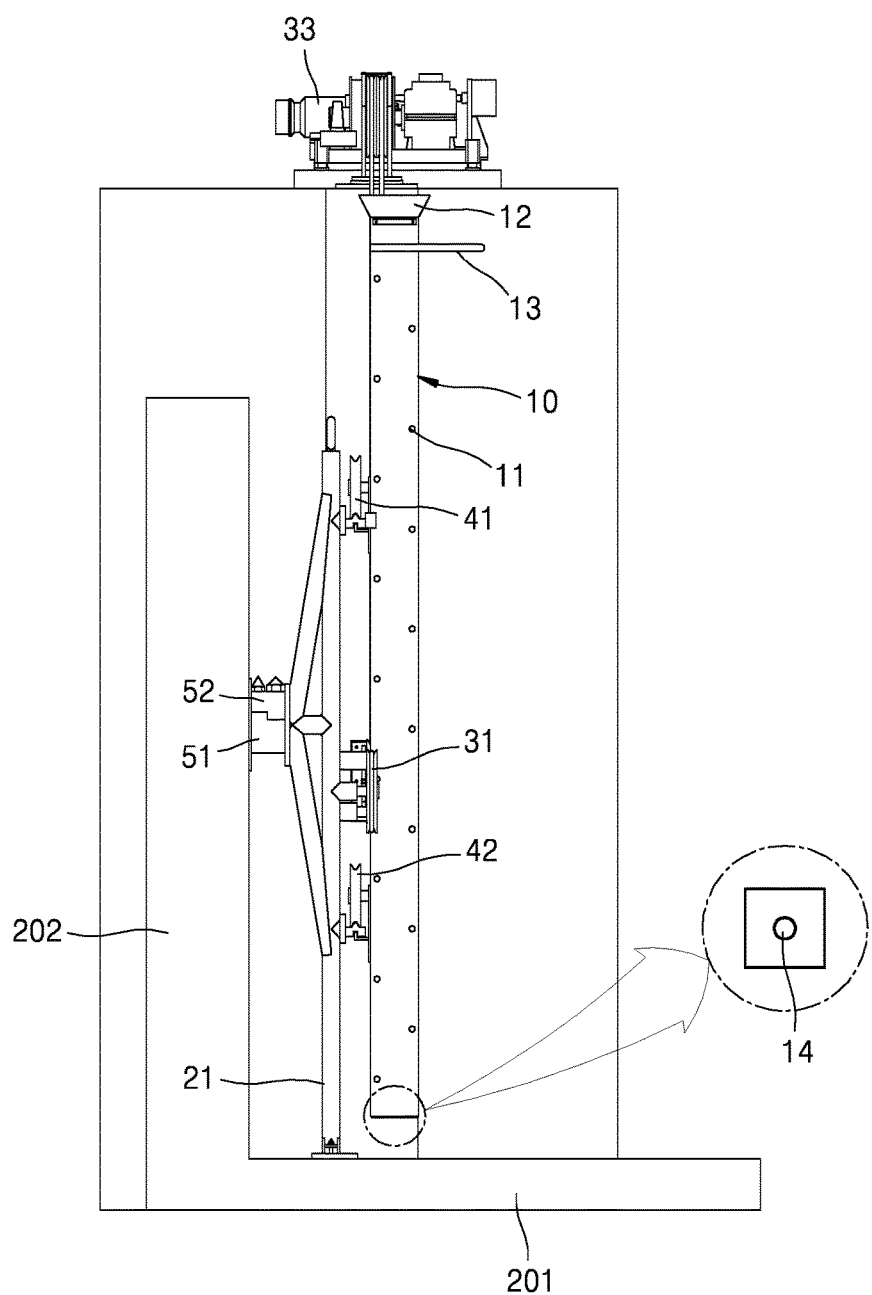
FIG. 4 is a side view of the spent fuel transfer device of FIG. 3.
Figure 5:
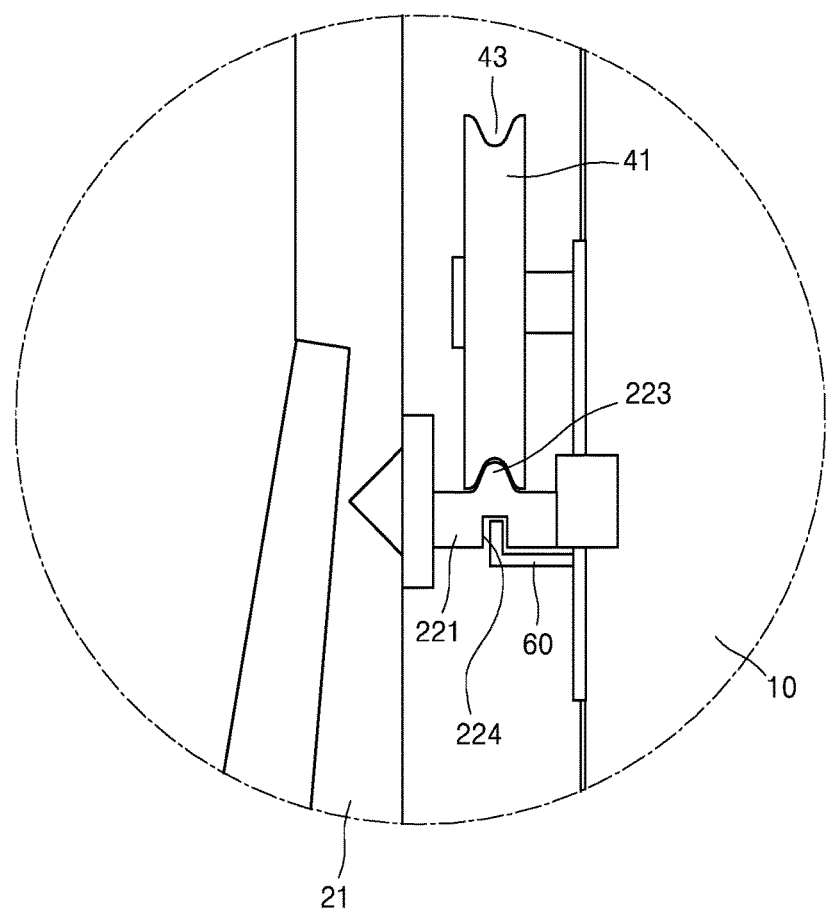
FIG. 5 is a diagram showing main parts of FIG. 4.
Figure 6:
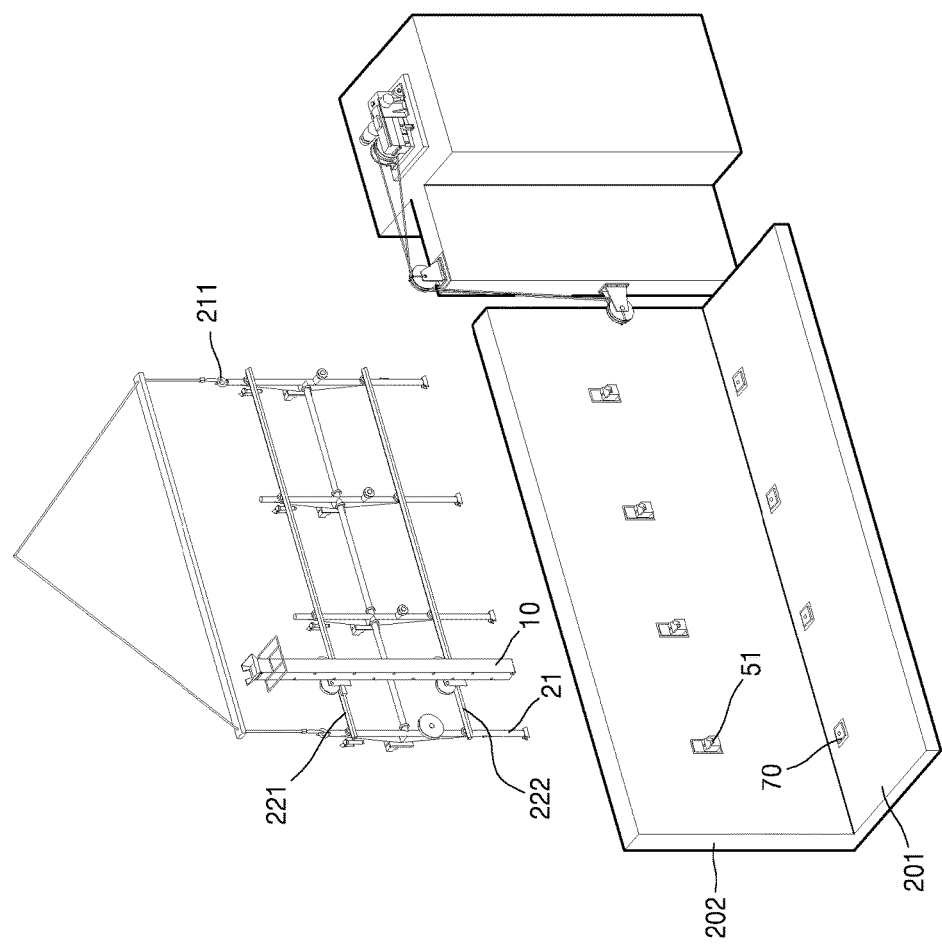
FIG. 6 is a diagram showing a state in which a transfer container and a guide frame are isolated from each other.
Figure 7:
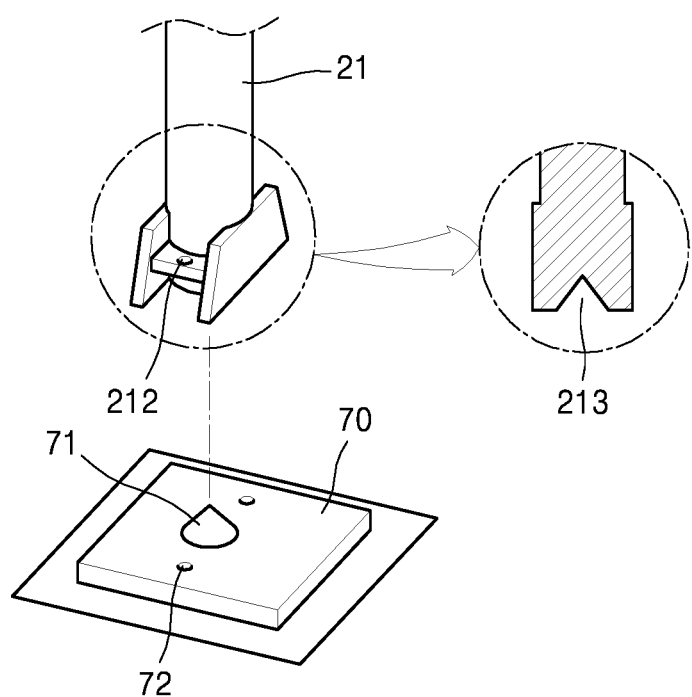
FIG. 7 is a diagram showing elements of FIG. 6.
Figure 8:
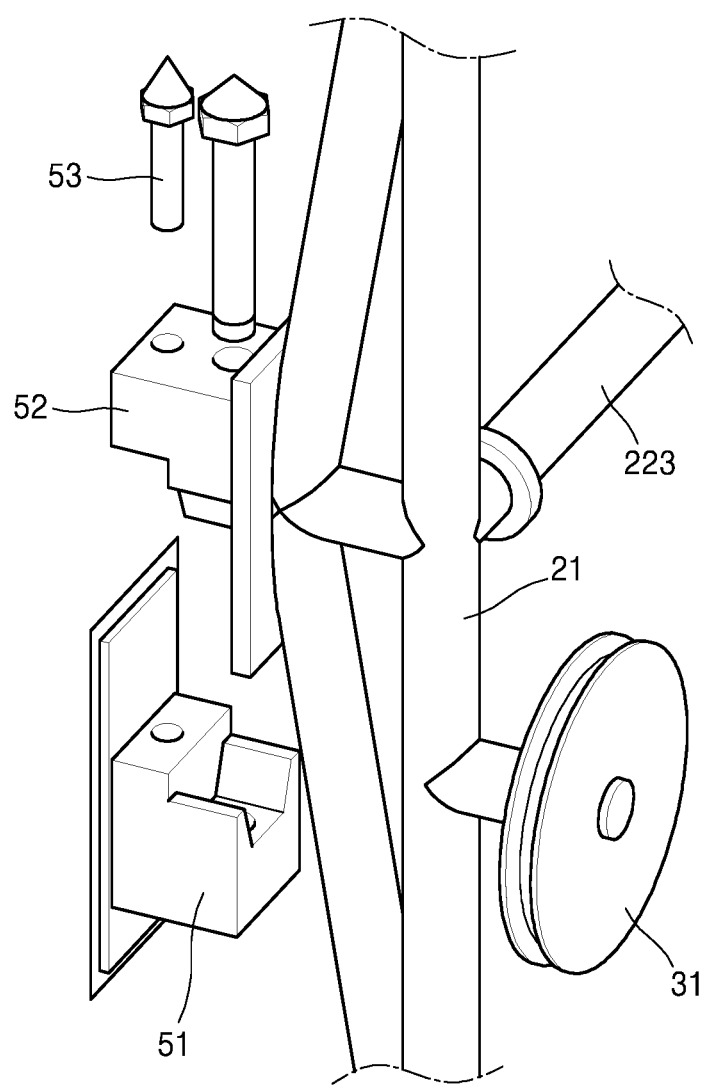
FIG. 8 is an exploded perspective view showing elements of FIG. 4.
Figure 9:
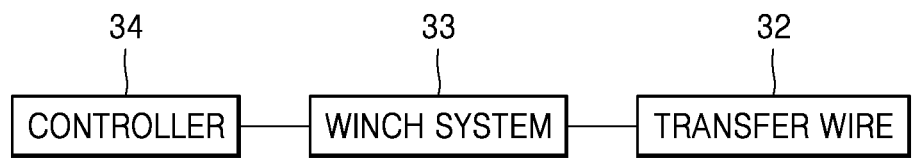
FIG. 9 is a block diagram of a transfer unit according to an exemplary embodiment.

FIG. 2 is a conceptual view showing an arrangement of a spent fuel transfer device according to an exemplary embodiment, FIG. 3 is a perspective view of a spent fuel transfer device according to an exemplary embodiment, and FIG. 4 is a side view of the spent fuel transfer device of FIG. 3. FIG. 5 is a diagram showing main parts of FIG. 4, FIG. 6 is a diagram showing a state in which a transfer container and a guide frame are isolated from each other, and FIG. 7 is a diagram showing main elements of FIG. 6. FIG. 8 is an exploded perspective view showing main elements in FIG. 4, and FIG. 9 is a block diagram of a transfer unit according to an exemplary embodiment.

As shown in FIG. 2, one or more exemplary embodiments are directed to a device for transferring spent fuel between storage pools 300 and 400. A refueling cavity 200 is connected to a containment building, and the spent fuel is stored in the storage pool 300 via the refueling cavity 200 from containment building. The storage pool 300 includes a spent fuel handling machine (same as that of FIG. 1, and detailed descriptions thereof are omitted here), so that the spent fuel handling machine transfers the spent fuel from the refueling cavity 200 to the storage pool 300 through a gate 301. When transferring the spent fuel stored in the storage pool 300 to the storage pool 400, the spent fuel handling machine transfers the spent fuel to a spent fuel transfer device 100 provided in the refueling cavity 200 via the gate 301. When the spent fuel transfer device 100 according to the exemplary embodiment transfers the spent fuel transferred from the storage pool 300 toward the storage pool 400, a spent fuel handling machine (same as that of FIG. 1, and detailed descriptions thereof are omitted here) provided separately in the storage pool 400 transfers the spent fuel into the storage pool 400 via a gate 401 to finish the transfer of spent fuel between the storage pools 300 and 400.

As shown in FIG. 3, the spent fuel transfer device 100 for transferring spent fuel between the spent fuel storage pools according to the exemplary embodiment includes a transfer container 10, a guide frame 20, and a transfer unit.

The transfer container 10 extends in a direction and is disposed vertically, and contains spent fuel therein. The transfer container 10 is disposed in the refueling cavity 200, and the refueling cavity 200 is normally empty, whereas the transfer container 10 is filled with water when transferring spent fuel.

First holes 11 are formed in the transfer container 10 for cooling down the spent fuel. The first holes 11 are formed in an outer circumferential surface of the transfer container 10.

In addition, as shown in FIG. 4, a second hole 14 is formed in a lower end portion of the transfer container 10 for cooling down and discharging cooling water. The second hole 14 is disposed to discharge the cooling water contained in the transfer container 10 when draining the refueling cavity 200 after finishing the transfer of spent fuel between the storage pools 300 and 400.

In addition, a guide plate 12 of a slope shape is disposed on an upper end portion of the transfer container 10 for easily inserting spent fuel transferred by the spent fuel handling machine. In addition, a bumper 13 is disposed on an upper end portion of the transfer container 10.

In the present exemplary embodiment, the bumper 13 is disposed lower than the guide plate 12. A predetermined distance is maintained between the spent fuel handling machine and the transfer container 10 due to the bumper 13. The bumper 13 may prevent collision between the spent fuel handling machine and the transfer container 10 caused due to negligence of an operator while driving the spent fuel handling machine, or may prevent spent fuel from being additionally inserted by the spent fuel handling machine in a state where the spent fuel is already contained in the transfer container 10. The bumper 13 surrounds the transfer container 10 as ring bar in a direction perpendicular except in the wall direction to a lengthwise direction of the transfer container 10.

The guide frame 20 is provided to guide the transfer container 10 while maintaining the longitudinal orientation of the transfer container 10. The guide frame 20 includes support frames 21 and a guide rail 22.

The support frames 21 are arranged on a bottom surface 201 of the refueling cavity 200 to be spaced apart from each other in a vertical direction. According to the present exemplary embodiment, the bottom surface 201 of the refueling cavity 200 may provide an additional base surface for installing the support frames 21. In the present specification, when the base surface is formed, the bottom surface 201 of the refueling cavity 200 may denote the base surface.

As shown in FIGS. 6 and 7, base plates 70 are disposed on the bottom surface 201 of the refueling cavity 200 for coupling to the support frames 21, and lower end portions of the support frames 21 are coupled to the base plates 70. In detail, according to the present exemplary embodiment, the base plates 70 are steel plates that are welded on the bottom surface 201 of the refueling cavity 200, and the lower end portions of the support frames 21 are coupled to the steel plates.

A positioning protrusion 71 is formed on each of the base plates 70 for easily determining an installation location of the support frame 21, and an insertion recess 213 to which the positioning protrusion 71 is inserted is formed in a lower surface of each of the support frames 21. The lower end portion of the support frame 21 is coupled to the base plate 70 via a bolt, and may be separate from the base plate 70 if necessary. A bolt hole 72 and a coupling hole 212 for bolting process are respectively formed in the base plate 70 and at the lower end portion of the support frame 21.

The guide rail 22 is coupled to the support frames 21 and disposed horizontally. In the present exemplary embodiment, the guide rail 22 includes an upper rail 221 and a lower rail 222, and an intermediate frame 23 is disposed between the upper rail 221 and the lower rail 222 horizontally.

As shown in FIGS. 4 and 5, a guide protrusion 223, in which a recess 43 of a guide wheel 40 that will be described later is formed on an upper surface of the guide rail 22, and a guide recess 224 is formed in a lower surface of the guide rail 22. A guide pin 60 is inserted in the guide recess 224. An end portion of the guide pin 60 is connected to the transfer container 10 and the other end portion of the guide pin 60 is inserted into the guide recess 224 so as to guide the transfer container 10 together with the guide protrusion 223 when the transfer container 10 is transferred.

The transfer unit is provided to transfer the transfer container 10 along the guide frame 20. In the present exemplary embodiment, as shown in FIG. 3, the transfer unit includes a pulley 31, a transfer wire 32, a winch system 33, and a controller 34. The pulley 31 is coupled to the guide frame 20. The transfer wire 32 is wound around the pulley 31 and the winch system 33 winds or unwinds the transfer wire 32. The controller 34 is provided to control the winch system 33.

In more detail, the transfer container 10 includes a pair of connection portions 15 to which the transfer wire 32 is connected. The transfer wire 32 is connected to one of the connection portions 15 at a side and extends to be connected to the other connection portion 15 at the other side. With the guide frame 20, a plurality of guide rollers 311 are provided in order to prevent hanging of the transfer wire 32 and to stably guide the transfer wire 32. In addition, a switching pulley 312 is provided to guide the transfer wire 32 to the winch system 33.

According to the present exemplary embodiment, the guide wheel 40 is provided.

As shown in FIGS. 3 and 5, the guide wheel 40 is coupled to the transfer container 10. The guide wheel 40 is moved to left and right sides along the guide rail 22. That is, the transfer container 10 is moved to the left and right sides when the transfer wire 32 is wound or unwound, and at this time, the guide wheel 40 moves along the guide rail 22 to make the transfer container 10 move stably. As described above, the guide protrusion 223 of the guide rail 22 is inserted into the recess 43 of the guide wheel 40.

According to the present exemplary embodiment, an upper guide wheel 41 moving along the upper rail 221 and a lower guide wheel 42 moving along the lower rail 222 are provided. Since the transfer container 10 is transferred in parallel in a state where the upper guide wheel 41 and the lower guide wheel 42 support the transfer container 10, posture of the transfer container 10 may be stably maintained during transferring the transfer container 10.

According to the present exemplary embodiment, the transfer container 10 and the guide frame 20 may be detachably coupled to an inner wall surface of the refueling cavity 200.

As shown in FIGS. 6 and 8, first brackets 51 are provided on the inner wall 202 surface of the refueling cavity 200, and second brackets 52 are connected to the support frames 21. The first bracket 51 has 'L' shape and the second bracket 52 has 'ㄱ' shape. The first brackets 51 and the second brackets 52 are respectively coupled to each other by coupling bolts 53 which have different bolt size in order to connect between brackets (51 and 52) easily. As shown in FIG. 6, a hook lug 211 is formed on the upper portion of the support frame 21. The first and second brackets 51 and 53 are isolated from each other, and a hook of an additional salvage device is inserted in the hook lug 211 so as to salve the support frames 21 and the transfer container 10 together.

As described above, according to the spent fuel transfer device 100 of the present exemplary embodiment, the spent fuel is transferred vertically in the water between the storage pools 300 and 400 in the fuel handling area, and thus, following effects may be obtained.

When a capacity of the fuel storage pool is expanded in consideration of increase in planned lifespan of a nuclear power plant, spent fuel of a nuclear reactor that is operating may be easily transferred to be stored within the plant. In addition, when transferring the spent fuel between the storage pools 300 and 400, the spent fuel may be stably transferred in a vertical orientation by using the spent fuel handling machine according to the prior art, and thus, stability of handling the spent fuel may be improved and an operating efficiency of an operator may be improved.

In addition, since the spent fuel may be transferred between the storage pools 300 and 400 within the fuel handling area during driving the nuclear reactor, the fuel may be transferred independently from the driving of the nuclear reactor. In addition, since the spent fuel transfer device 100 uses independent mechanical apparatus such as the transfer container 10, the guide frame 20, and the transfer unit, the spent fuel transfer device 100 may be driven in parallel with other devices and may be detachable from the refueling cavity 200 to improve maintenance property.

According to the spent fuel transfer device, the spent fuel may be transferred easily and stably to a designated location while maintaining its vertical orientation within the refueling cavity.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A device for transferring spent fuel between spent fuel storage pools, the device comprising:
   a transfer container extending in a direction, disposed in a vertical direction, and containing spent fuel therein;
   a guide frame configured to guide the transfer container while maintaining a vertical orientation of the transfer container; and
   a transfer unit configured to transfer the transfer container along the guide frame,
   wherein the guide frame comprises support frames disposed on a bottom surface of a refueling cavity in a vertical direction to be spaced apart from each other, and a guide rail disposed in a horizontal direction to be coupled to the support frames,
   the transfer container and the guide frame are detachably coupled to an inner wall surface of the refueling cavity,
   first brackets are provided on the inner wall surface of the refueling cavity, and second brackets are connected to the support frames,
   the first brackets and the second brackets are respectively coupled to each other by coupling bolts,
   a hook lug is formed on upper portion of the support frames so as to salvage the guide frame and the transfer container together,
   a guide wheel coupled to the transfer container, wherein the guide wheel moves along the guide rail,
   a guide protrusion inserted in a recess of the guide wheel is provided on an upper surface of the guide rail and a guide recess is formed in a lower surface of the guide rail, and the device further comprises a guide pin having one end portion connected to the transfer container and the other end portion inserted in the guide recess.

2. The device of claim 1, wherein the transfer container comprises a plurality of first holes for cooling down the spent fuel.

3. The device of claim 1, wherein the transfer container comprises a second hole on a lower portion thereof for cooling-down and discharging cooling water.

4. The device of claim 1, wherein a bumper surrounds with an upper end portion of the transfer container in a direction perpendicular to a lengthwise direction of the transfer container so as to maintain a distance between the transfer container and a spent fuel handling machine that transfers the spent fuel to the transfer container.

5. The device of claim 1, wherein the transfer unit comprises:
   a pulley coupled to the guide frame;
   a transfer wire wound around the pulley;
   a winch system configured to wind or unwind the transfer wire; and
   a controller configured to control the winch system.

6. The device of claim 1, wherein base plates are disposed on a bottom surface of the refueling cavity for coupling to the support frames, lower end portions of the support frames are coupled to the base plates, and a positioning protrusion is formed on each of the base plates and an insertion recess into which the positioning protrusion is inserted is formed in a lower surface of each of the support frames.

* * * * *